US012754462B2

(12) United States Patent
Bingle et al.

(10) Patent No.: US 12,754,462 B2
(45) Date of Patent: Oct. 6, 2026

(54) ADJUSTABLE CAMERA MOUNT AND SYSTEM THEREOF

(71) Applicant: Air Lift Company, Lansing, MI (US)

(72) Inventors: Robert Bingle, Dewitt, MI (US); Brian Berry, Okemos, MI (US); Cody Wolgamott, Potterville, MI (US); Corey Rosser, Grand Rapids, MI (US); John Varick, Ann Arbor, MI (US); Jimmy McWherter, Macomb Township, MI (US); Austin Rivera, Waterford, MI (US); Joseph Nieman, Waterford, MI (US)

(73) Assignee: AIR LIFT COMPANY, Lansing, MI (US)

( * ) Notice: Subject to any disclaimer, the term of this patent is extended or adjusted under 35 U.S.C. 154(b) by 146 days.

(21) Appl. No.: 18/926,454

(22) Filed: Oct. 25, 2024

(65) Prior Publication Data

US 2025/0138400 A1 May 1, 2025

Related U.S. Application Data

(60) Provisional application No. 63/545,821, filed on Oct. 26, 2023.

(51) Int. Cl.
*G03B 17/56* (2021.01)
*G03B 17/12* (2021.01)

(52) U.S. Cl.
CPC .......... *G03B 17/561* (2013.01); *G03B 17/12* (2013.01); *G03B 17/563* (2013.01)

(58) Field of Classification Search
CPC ..... G03B 17/12; G03B 17/561; G03B 17/563
See application file for complete search history.

(56) References Cited

U.S. PATENT DOCUMENTS

| | | | | |
|---|---|---|---|---|
| 9,961,306 B1 * | 5/2018 | Lev | H04R 1/028 |
| 11,745,645 B2 * | 9/2023 | Sickler | B60Q 1/24<br>396/419 |
| 2025/0018855 A1 * | 1/2025 | Varick | B60R 11/04 |

* cited by examiner

*Primary Examiner* — Lin Ye
*Assistant Examiner* — Chriss S Yoder, III
(74) *Attorney, Agent, or Firm* — McDonald Hopkins LLC

(57) ABSTRACT

An adjustable vehicle camera mount apparatus for selectively orienting a camera. The vehicle camera mount apparatus includes a dockable camera enclosure and a camera dock. The dockable camera enclosure can include a body and two spring-loaded plungers, with each spring-loaded plunger including two arcuate arms having meshing teeth. The camera dock can include a base and two opposing docking wings defining two parallel channels and a retaining ring having meshing teeth. The dockable camera enclosure is configured to rotate in relation to the camera dock through a plurality of distinct indexing positions defined by friction between the meshing teeth of the arcuate arms and the meshing teeth of the retaining rings. A related system is provided including a interchangeable dockable camera enclosure, a temporary camera dock, and a permanent dock.

20 Claims, 12 Drawing Sheets

ADJUSTABLE CAMERA MOUNT AND SYSTEM THEREOF

BACKGROUND OF THE INVENTION

The present invention relates to an adjustable camera mount and system.

Large or unusually shaped vehicles like trucks and trailers can be difficult to maneuver and manage, especially in small regions or when backing up. These difficulties are magnified when field of view and/or spatial awareness is limited.

To address the above issues, and similar issues, many modern vehicles come equipped with pre-installed backup cameras or pre-installed sensors. Alternatively, separate automobile or trailer backup cameras are available to be either temporarily or permanently mounted to the back of a car or trailer and provide similar benefits. The purpose of these cameras and sensors is to artificially increase the visibility and awareness of a driver of a vehicle to increase flexibility in backing up or otherwise operating the vehicle.

While there have been numerous advances in the field of backup cameras in recent years, there remains room for improvement. That is, many of the current technologies and products fail to provide sufficient flexibility and optimize field of view for drivers. This limited flexibility mitigates the effectiveness of existing backup cameras and decreases the safety and maneuverability benefits of the backup cameras. Accordingly, there remains room for improvement in the field of backup camera technology.

SUMMARY OF THE INVENTION

An adjustable camera mount apparatus is disclosed. The apparatus includes a dockable camera enclosure and a camera dock. The dockable camera enclosure includes a body defining an internal space for receiving a camera. The body has two opposite ends and a face that includes a camera aperture. The dockable camera enclosure further includes an outer wall on each end of the body, with each of the outer walls having a pair of arcuate apertures. The dockable camera enclosure also includes two spring-loaded plungers, each spring-loaded plunger including a platform disposed within the internal space of the body, and two arcuate arms projecting from the platform and extending through the arcuate apertures of the outer wall. Each arcuate arm has meshing teeth arranged along a radius of curvature of the arcuate arm.

The camera dock includes a base and two opposing enclosure docking wings joined to the base for docking the camera enclosure. Each docking wing defines two parallel docking channels for receiving the arcuate arms of one of the spring-loaded plungers and a retaining ring having meshing teeth arranged along a radius of the retaining ring. The mountable camera enclosure is configured to rotate through a plurality of distinct indexing positions defined by friction between the meshing teeth of the arcuate arms and the meshing teeth of the retaining rings.

In some embodiments, the camera dock can be a permanent camera dock such that the base of the permanent camera dock can be configured to be permanently coupled to a vehicle or a vehicle trailer. The base of the permanent camera dock can define at least two mounting apertures, with each mounting aperture configured to receive a fastener. The two mounting apertures may be disposed toward opposite ends of the base of the permanent camera dock, and the base of the permanent camera dock may further define a power cable aperture configured to route a power cable therethrough.

In alternative embodiments, the camera dock can be a temporary camera dock where the base of the temporary camera dock includes a suction system configured to temporarily join the temporary camera dock to a vehicle or a vehicle trailer without the use of tools.

The suction system can include a rotatable handle connected to a suction mounting foot by a rigid stem. The handle can be configured to rotate between an unlocked position where the rigid stem is at a first lateral position and a locked position where the rigid stem is at a second lateral position. The handle can include two tabs on opposite ends of the rigid stem and is laterally movable relative to the base of the temporary camera dock to create a vacuum between the suction mounting foot and the surface upon which it is being mounted. Each of the tabs rides along a respective suction ramp that defines an unlocked position detent on a bottom of the suction ramp and a locked position detent on a top of the suction ramp. The base of the temporary camera dock generally includes the suction ramps.

Each enclosure docking wing of the temporary camera dock can be hingedly coupled to the body. Each end of the external face of the base of the temporary camera dock can include two hinge retainers, which extend outwardly from the external face of the base. Each of the enclosure docking wings are inwardly foldable about respective hinges into a closed, folded, position and outwardly foldable about respective hinges into an open, unfolded, position where the hinge retainers prevent unfolding the enclosure docking wings past the open position.

Generally, the body of the dockable camera enclosure includes two parallel interior walls. The interior walls trisect the internal space into a camera receiving space and two plunger receiving spaces. The camera receiving space is defined by the two interior walls of the body, the face of the body, and an open end of the body. Each plunger receiving space is defined by one of the interior walls of the body, one of the outer walls of the body, the face of the body, and by the open end of the body.

Each spring-loaded plunger can further include a compression spring joined to the platform opposite the arcuate arms. Each spring-loaded plunger can be disposed partially within one of the plunger receiving spaces such that: (1) the compression spring is disposed completely within one of the plunger receiving spaces of the body and contacts one of the internal walls of the body; (2) the platform is completely disposed within the plunger receiving space; and (3) the two arcuate arms project from the platform and extend through the arcuate apertures.

Each spring-loaded plunger is movable within the internal space such that a force applied to the spring-loaded plunger in a direction perpendicular to the outer wall of the dockable camera enclosure will move the spring-loaded plunger into a compressed position where the arcuate arms of the spring-loaded plunger are partially disposed within the internal space and the platform of the spring-loaded plunger will not contact the outer wall of the dockable camera enclosure.

An adjustable camera mount system is also disclosed. The system includes an interchangeable dockable camera enclosure, a temporary camera dock, and a permanent camera dock. The interchangeable dockable camera enclosure includes a body defining an internal space for receiving a camera. The body has two opposite ends and a face including a camera aperture. The temporary camera dock includes a base, a battery, a suction system, and two opposing enclosure docking wings connected to the base. The temporary camera dock is configured to temporarily join to a vehicle or a vehicle trailer without the use of tools. The permanent camera dock includes a base and two opposing enclosure docking wings connected to the base. The base is configured for permanent coupling to a vehicle or vehicle trailer.

The interchangeable dockable camera enclosure is configured for selective and interchangeable docking with both the temporary camera dock and the permanent camera dock. The interchangeable dockable camera enclosure is also configured to rotate through a plurality of distinct indexing positions while docked with either the temporary camera dock and the permanent camera dock. The system may further include a camera configured to wirelessly communicate data. The system may also include a vehicle and/or a vehicle trailer.

The current embodiments provide an apparatus and system for adjusting a camera securely docked to a camera mount as well as simple, efficient, and flexible selective camera docking between multiple camera docking mounts.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and may be practiced or carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DETAILED DESCRIPTION OF THE CURRENT EMBODIMENTS

Figure 1:
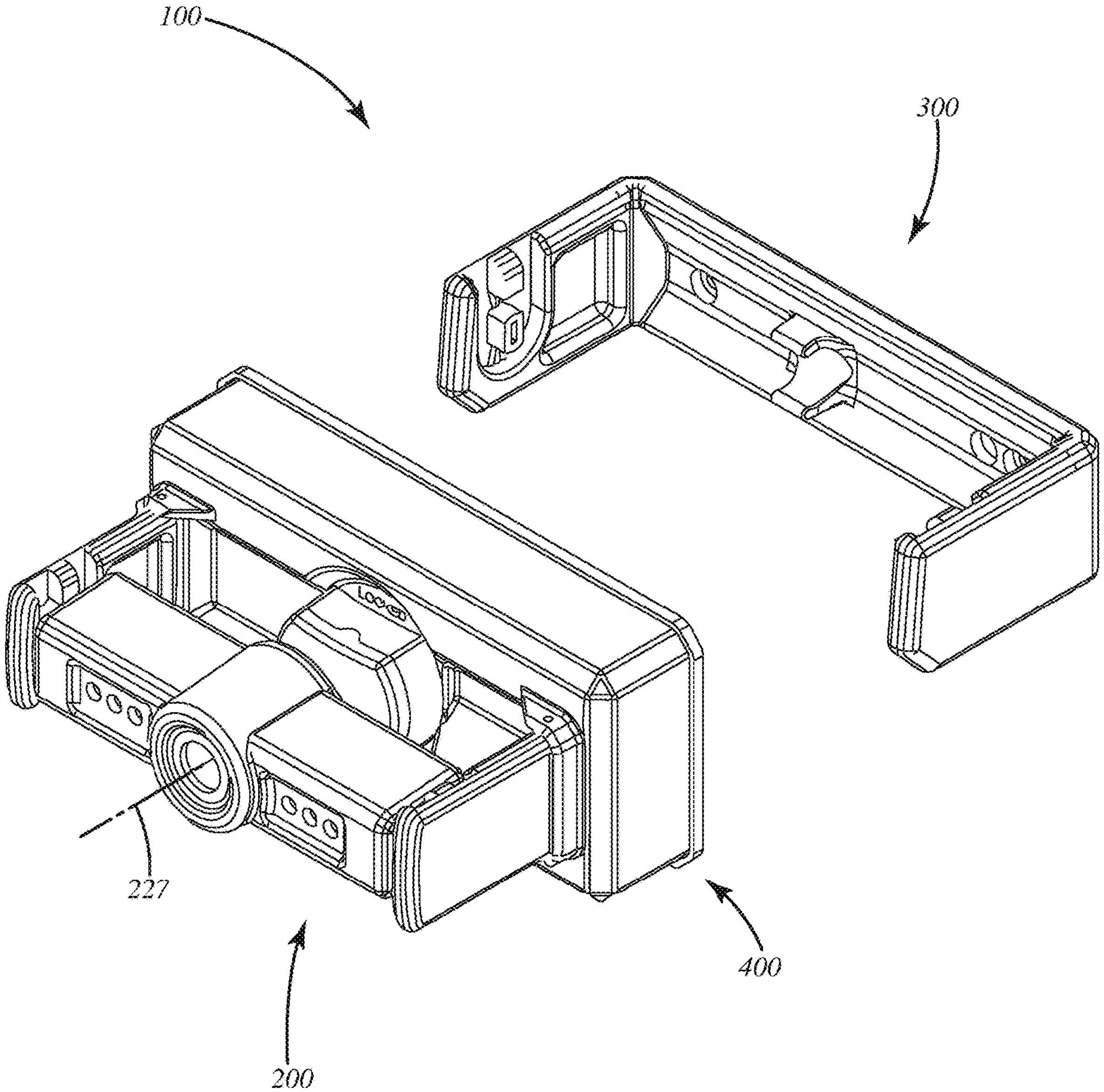
FIG. 1 illustrates a perspective view of an adjustable vehicle camera mount system including a temporary camera dock, a permanent camera dock, and a dockable camera enclosure.

Several embodiments of an adjustable camera mount system 100 and components thereof for a vehicle and/or vehicle trailer in accordance with the present disclosure are shown in FIGS. 1-16. As shown in FIG. 1, the adjustable vehicle camera mount system 100 includes an interchangeable dockable camera enclosure 200 that can receive a wireless camera, a permanent camera dock 300, and a temporary camera dock 400. The temporary camera dock 400 can be temporarily mounted, for example using a suction system 444 to suction to a rear surface of a vehicle and the permanent camera dock 300 can be permanently mounted, for example using fasteners to a rear surface of a vehicle trailer. The dockable camera enclosure 200 (and received wireless camera) can be selectively and interchangeably docked with either the permanent camera dock 300 or the temporary camera dock 400. While mounted in either dock, the dockable camera enclosure 200 can be rotated to adjust the orientation of the enclosure (and therefore the enclosed camera) and communicate data wirelessly to a user, for example to a vehicle dashboard or a user's smart device.

While the current embodiment of the adjustable camera mount system 100 or kit includes one dockable camera enclosure 200, a permanent camera dock 300, and a temporary camera dock 400, in alternative embodiments the adjustable camera mount system 100 kit can include a different number of components. For example, some kits may include two or more dockable camera enclosures 200, two or more temporary camera docks 400, and two or more permanent camera docks 300 such that any of the dockable camera enclosures can be interchangeably docked with any of the temporary or permanent camera docks.

The adjustable camera mount system 100 is suitable for use with cars, trucks, trailers, and essentially any other vehicle. The adjustable camera mount system 100 offers versatile mounting options that enhance rear vision while operating a vehicle for a user. The dockable camera enclosure 200 may be selectively docked between the permanently mounted camera dock 300 and the temporarily mounted camera dock 400, which provides visibility for a user in diverse scenarios including backing up, parking, or maneuvering in confined spaces with or without a trailer attached to the vehicle. The adjustable orientation provided by the docks allows further flexibility to orient the camera in a suitable manner regardless of where or to what type of vehicle/trailer the camera docks are mounted. The adjustable vehicle camera mount system 100 therefore provides excellent flexibility for users in a variety of different driving circumstances, enhancing both safety and maneuverability for a vehicle and/or its trailer.

The adjustable vehicle camera mount system 100 can further include a camera having a lens. In some embodiments the camera further includes one or more infrared (or other) sensors. The infrared sensors can detect human proximity and alert the remote user. Essentially any suitable camera can be utilized in connection with the adjustable vehicle camera mount system 100. In the current embodiment, the camera housing retainably fits within the main body of the camera enclosure 200. In the current embodiment, the camera communicates camera data (e.g., vision data and sensor data) wirelessly to a user device (e.g., a personal smart device and/or a vehicle cabin device). In some embodiments, camera data can be communicated alternatively or additionally via a data cable to another vehicle system (e.g., over a vehicle Controller Area Network (CAN) bus). The camera may be powered by an internal or external power source. For example, the camera can have its own self-contained battery or can be powered via a wired power connection to an external power source (e.g., a power source located elsewhere on the vehicle or trailer).

The interchangeable dockable camera enclosure 200 is configured for selective and interchangeable docking at a docking orientation. The interchangeable dockable camera enclosure 200 may dock with either the temporary camera dock 400 or the permanent camera dock 300. The interchangeable dockable camera enclosure 200 may be docked and undocked without the use of tools. When the interchangeable dockable camera enclosure 200 has been docked at the docking orientation the interchangeable dockable camera enclosure 200 is referred to generally as an interchangeable docked camera enclosure 200 or an interchangeable seated camera enclosure 200, or alternatively simply as a docked or seated camera enclosure 200. The interchangeable docked camera enclosure 200 is configured to rotate through a plurality of distinct and secure indexing positions and a docking position while docked with either the temporary camera dock 400 or the permanent camera dock 300. The interchangeable docked camera enclosure 200 is configured for undocking at the docking orientation from either the temporary camera dock 400 or the permanent camera dock 300. The interchangeable dockable camera enclosure 200 may be undocked without the use of tools. It will be appreciated that the interchangeable seated camera enclosure 200 is re-dockable such that the seated camera enclosure 200 can be repeatedly docked with different or the same camera docks 300, 400.

In some embodiments, the adjustable camera mount system 100 can include a trailer or a vehicle. The adjustable camera mount system 100 can work in conjunction with essentially any suitable trailer or vehicle. For example, suitable trailers and/or vehicles can include those that have a surface to which the temporary camera dock 400 or permanent camera dock 300 are capable of being affixed such that the camera can capture a suitable view.

An adjustable camera mount apparatus in accordance with the present disclosure can be mounted to trucks, trailers, cars, and other vehicles. However, the adjustable camera can be used in any circumstance where an adjustable camera mount apparatus is suitable. The adjustable camera mount apparatus can include a dockable camera enclosure 200 and a camera dock 300, 400. The camera mount apparatus may be either permanently or temporarily mounted. In permanent mount embodiments it may be mounted with fasteners and tools such that it is not readily removable without the use of tools. In temporary mount embodiments, it may be mounted without the use of tools (e.g., by using an integrated suction mount feature of the temporary camera dock 400). The temporary camera mount apparatus may be portable so that a user can easily remove, transport, and reattach the temporary camera mount.

The adjustable camera mount system 100 includes a dockable camera enclosure 200, perhaps best shown in FIGS. 2-6. The dockable camera enclosure 200 is configured to receive a camera. Structurally, the dockable camera enclosure 200 includes a body 202. The body 202 defines an internal space 204 for receiving a camera.

In the current embodiment, the body 202 generally includes two interior walls 206, 208. The interior walls 206, 208 are generally parallel to each other. These interior walls 206, 208 trisect the internal space 204 into three sub-spaces: a camera receiving space and two plunger receiving spaces 210, 212. The camera receiving space is sized and configured to receive a camera. The camera receiving space is defined by the two interior walls 206, 208 of the body 202, a front face 214 of the body 202, and an open back side 216 of the body 202. The two plunger receiving spaces 210, 212 are each sized and configured to receive a spring-loaded plunger 218, 220. Each plunger receiving space 210, 212 is defined by one of the interior walls 206, 208 of the body 202, one of the outer walls 230, 232 of the body 202, the front face 214 of the body 202, and by the open back side 216 of the body 202.

The body 202 also has two opposite ends 222, 224 and a front face 214. The front face 214 is generally perpendicular to the two interior walls 206, 208. The front face 214 includes a camera aperture 226 defining a lens optic axis 227. In some embodiments, the front face 214 further includes one or more sensor apertures 228. The body 202 includes an outer wall 230, 232 on each end 222, 224. These outer walls 230, 232 are generally perpendicular to the front face 214 of the body 202 and parallel to each other. In some embodiments, the two outer walls 230, 232 are parallel to each other, parallel to the two interior walls 206, 208, and extend perpendicularly from the front face 214. Each outer wall 230, 232 has a pair of arcuate apertures 234 for facilitating docking of the dockable camera enclosure 200 and orientation adjustment of the dockable camera enclosure 200 while docked.

The dockable camera enclosure 200 further includes two spring-loaded plungers 218, 220. Each spring-loaded plunger 218, 220 includes a platform 236, 238. The platform 236, 238 is disposed within the internal space 204 and has two opposite surfaces. Generally, the platform is disposed within one of the plunger receiving spaces 210. Each spring-loaded plunger 218, 220 includes two arcuate arms 240, 242. Each arcuate arm 240, 242 projects from one of the surfaces of the platform 236 and extends through one of the arcuate apertures 234 of an outer wall 230, 232 of the camera enclosure 200. It will be appreciated that the shape of each arcuate arm 240, 242 can be selected in view of the shape of the arcuate arm's 240, 242 respective arcuate aperture 234. Each arcuate arm 240, 242 has a point of connection where the arcuate arm 240, 242 is integrally connected with the platform 236, 238 of the spring-loaded plunger 218, 220. Each arcuate arm 240, 242 has an indexing surface opposite the point of connection formed by meshing teeth 244. That is, meshing teeth 244 extend from the indexing surface, with each meshing tooth 244 having a triangular prism structure with a base at the indexing surface from which the meshing tooth 244 extends and a meshing ridge at an end opposite the base. The meshing teeth 244 are generally arranged along a radius of curvature of each arcuate arm 240, 242. In other words, the meshing teeth 244 are arranged such that each meshing ridge radiates outwardly from and points toward an imaginary center point of an imaginary circle of which two of the arcuate arms 240, 242 form portions of the circumference. In certain embodiments, the meshing teeth 244 get wider as the meshing teeth 244 radiate out from the imaginary center point.

Each spring-loaded plunger 218, 220 generally includes a compression spring 246, 248. The compression spring 246, 248 is connected to the surface opposite the surface from which the arcuate arms 240, 242 project. Each compression spring 246, 248 is disposed within the internal space 204. Generally, each compression spring 246, 248 is disposed entirely within the plunger receiving space 210, 212. Each compression spring 246, 248 is generally configured such that it contacts one of the interior walls 206, 208 of the camera enclosure 200. In these embodiments, each spring-loaded plunger 218, 220 is disposed partially within one of the plunger receiving spaces 210, 212 such that the compression spring 246, 248 is completely disposed within the plunger receiving space 210, 212 and rests against or is joined to one of the interior walls 206, 208, the platform 236, 238 is completely disposed within the plunger receiving space 210, 212, and the two arcuate arms 240, 242 project from the platform 236, 238 and extends through the arcuate apertures 234 such that the arcuate arms 240, 242 are only partially or not at all disposed within the plunger receiving space 210, 212.

Figure 2:
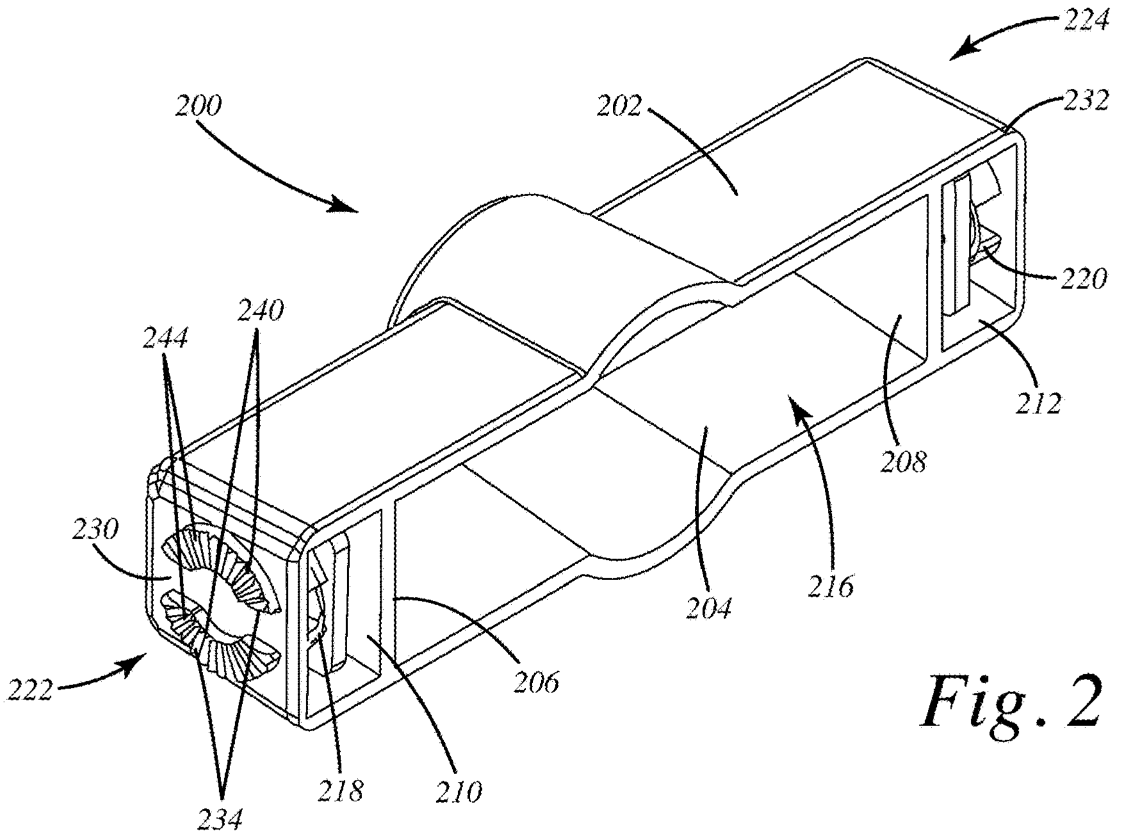
FIG. 2 illustrates a rear perspective view of a dockable camera enclosure with a spring-loaded plunger in a compression position.
Figure 3:
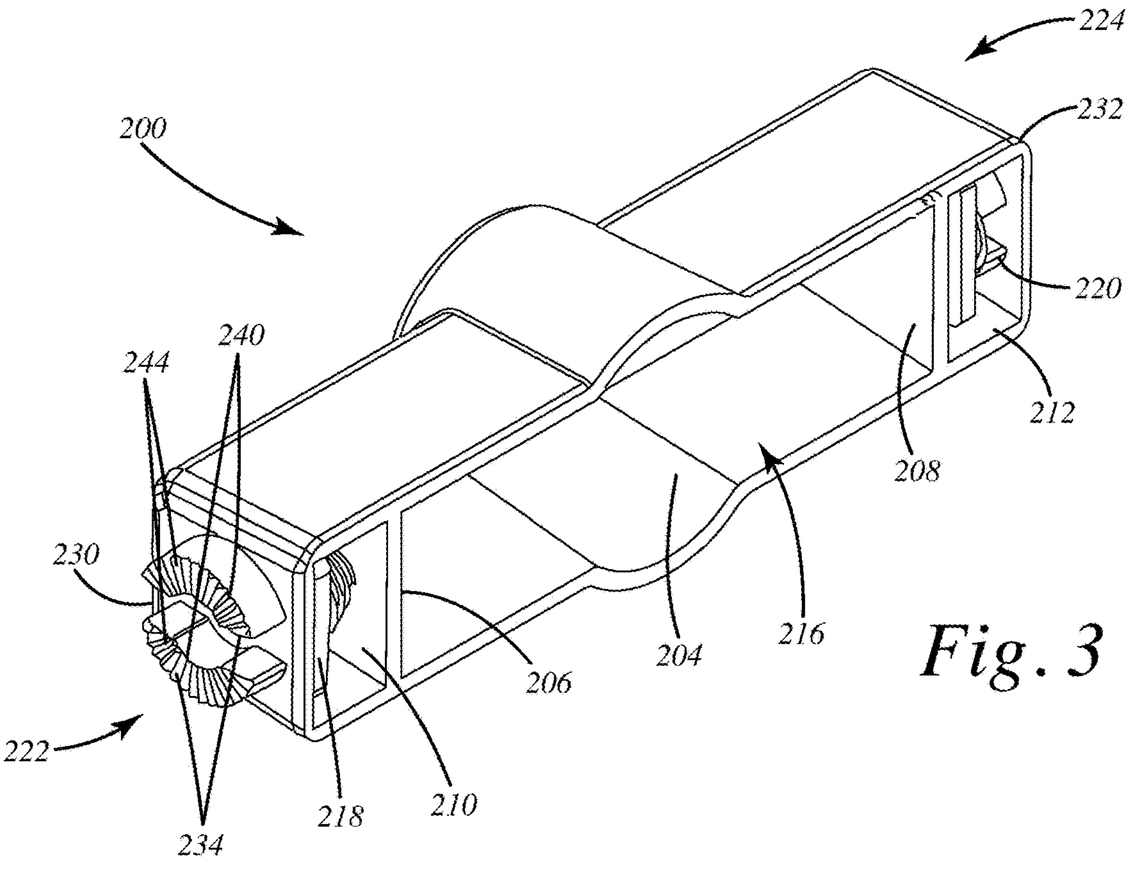
FIG. 3 illustrates a rear perspective view of a dockable camera enclosure with a spring-loaded plunger in a restored position.
Figure 4:
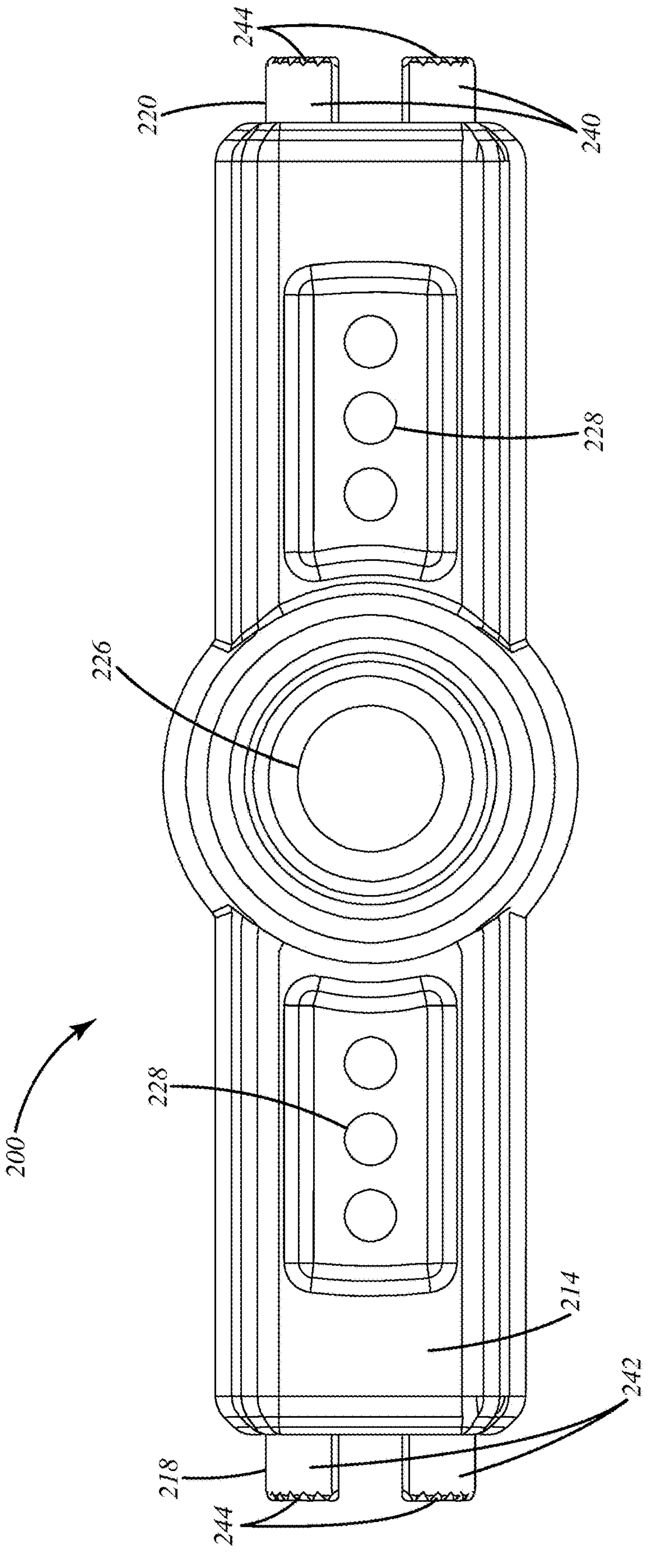
FIG. 4 illustrates a front view of a dockable camera enclosure with a spring-loaded plunger in a restored position.
Figure 5:
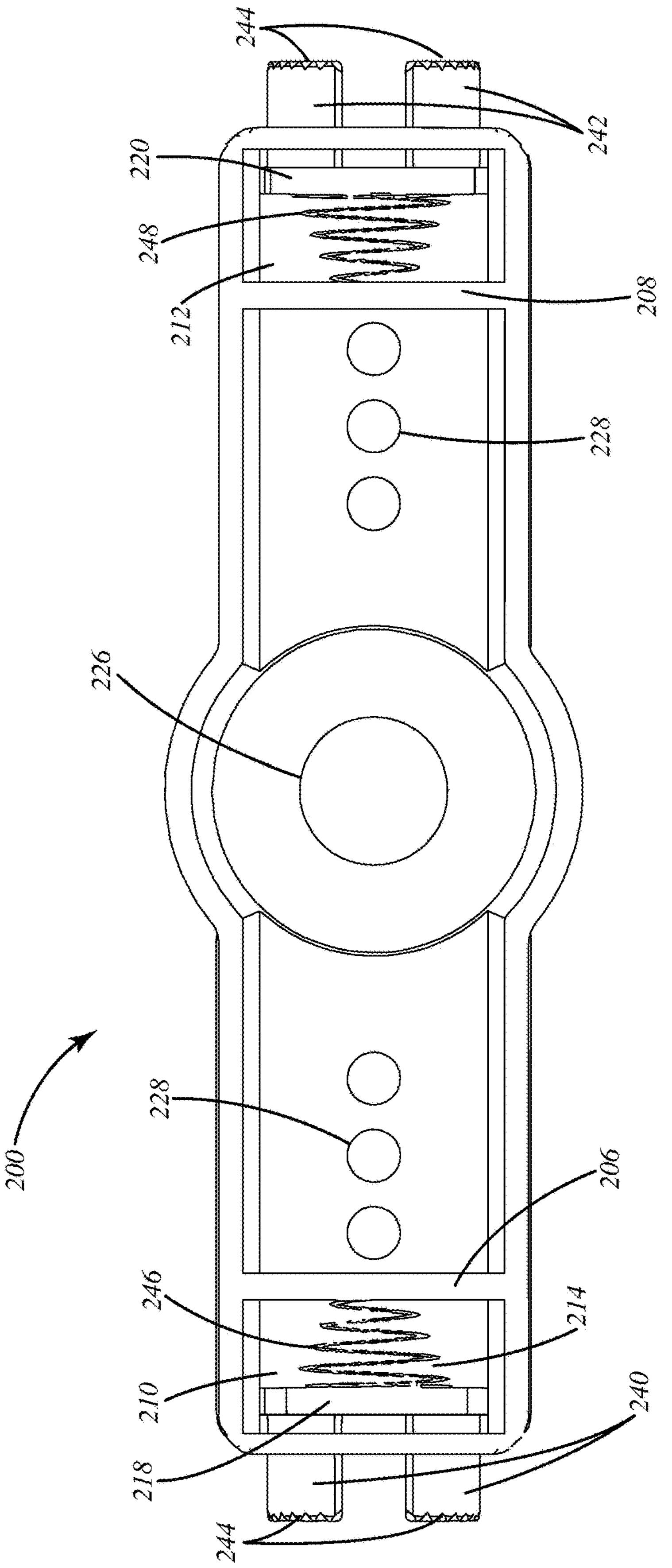
FIG. 5 illustrates a rear view of a dockable camera enclosure with a spring-loaded plunger in a restored position.

Notably, the spring-loaded plungers 218, 220 are movable within their respective internal spaces 204. Each spring-loaded plunger 218, 220 is configured so that a force applied to the spring-loaded plunger 218, 220 in a direction perpendicular to the outer wall 230, 232 of the dockable camera enclosure 200 will move the spring-loaded plunger 218, 220 deeper into the internal space 204 to a compressed position so long as the force is maintained. The compression position is depicted in FIG. 2. In the compressed position, the compression spring 246, 248 of the spring-loaded plunger 218, 220 will be under tension and will have a compressed length less than a normal length. The arcuate arms 240, 242 of the spring-loaded plunger 218, 220 will also be partially disposed within the internal space 204. The platform 236, 238 of the spring-loaded plunger 218, 220 will not contact the outer wall 230, 232 of the dockable camera enclosure 200. While not under external force, the compression springs 246, 248 of the spring-loaded plungers 218, 220 will release and restore the spring-loaded plungers 218, 220 back to restored positions where the platforms 236, 238 exert force (due to the compression springs 246, 248) against inner surfaces of their respective dockable camera enclosure 200 outer wall 230, 232 preventing further extension of the arcuate arms 240, 242. In this restored position, the arcuate arms 240, 242 of the spring-loaded plungers 218, 220 are fully extended outside the outer walls 230, 232 of the dockable camera enclosure to facilitate docking and orientation adjustment in cooperation with the camera dock 300, 400 as explained in more detail below.

Figure 7:
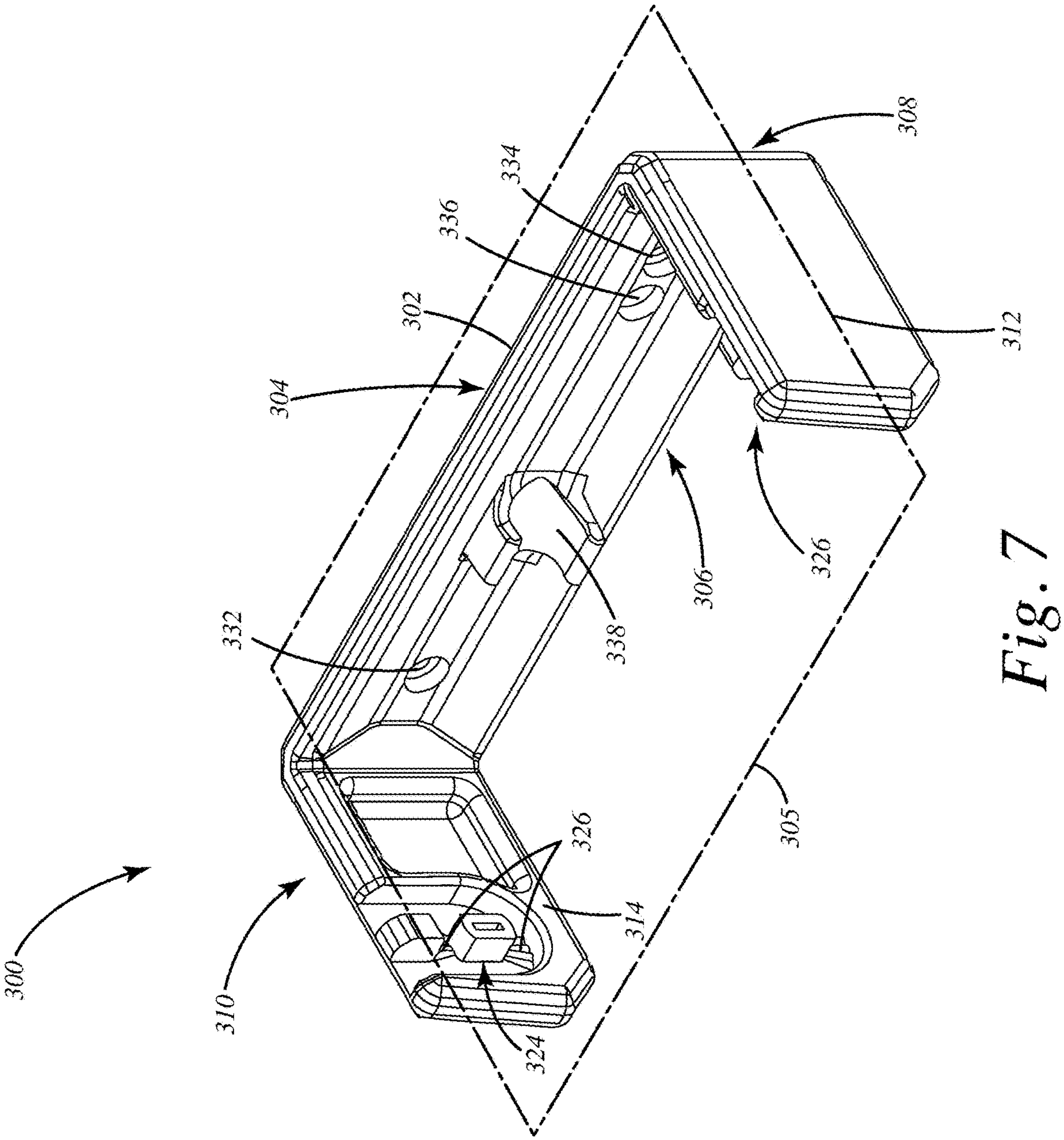
FIG. 7 illustrates a perspective view of a permanent camera dock.
Figure 8:
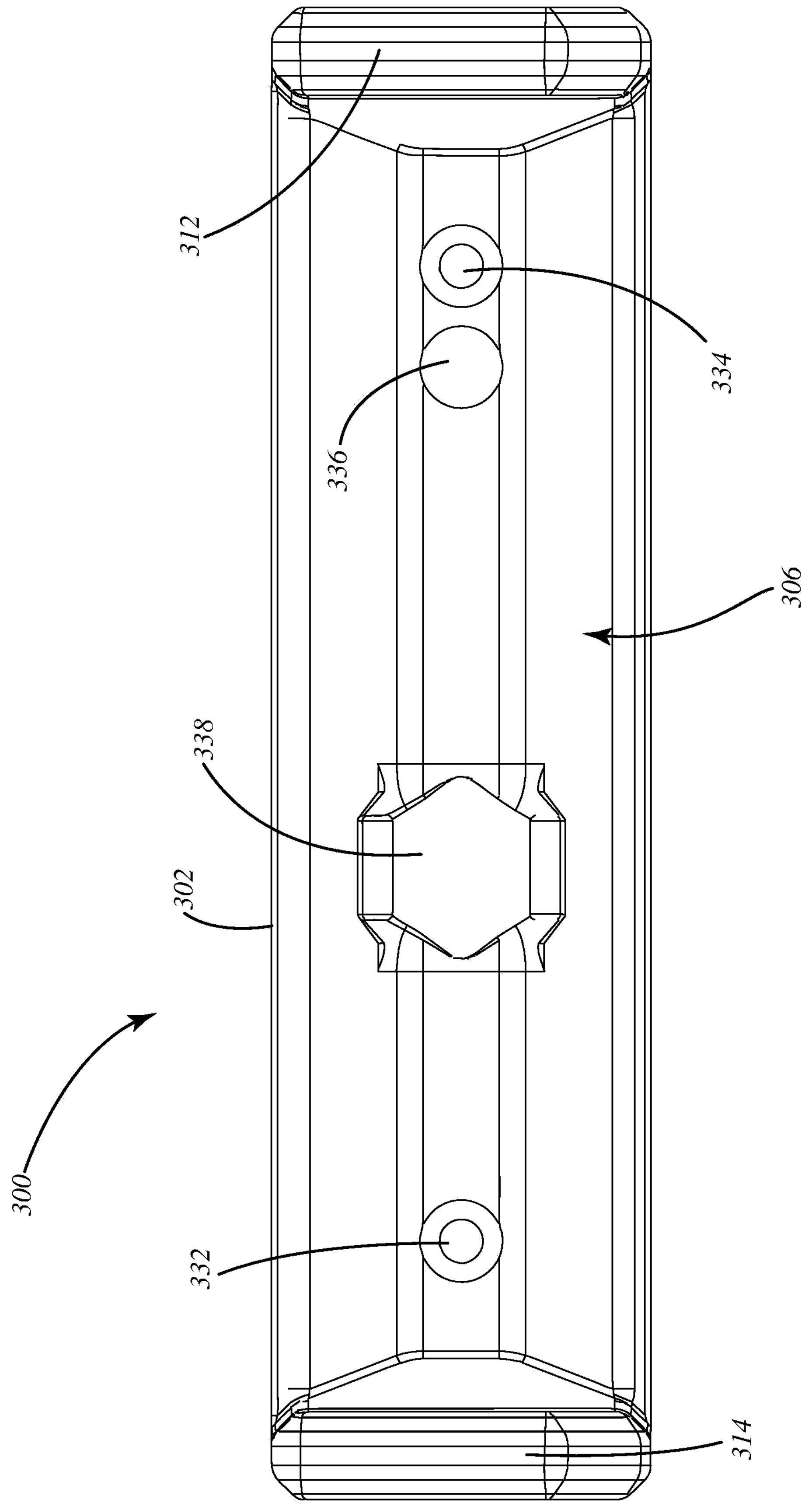
FIG. 8 illustrates a front view of the permanent camera dock of FIG. 7.
Figure 9:
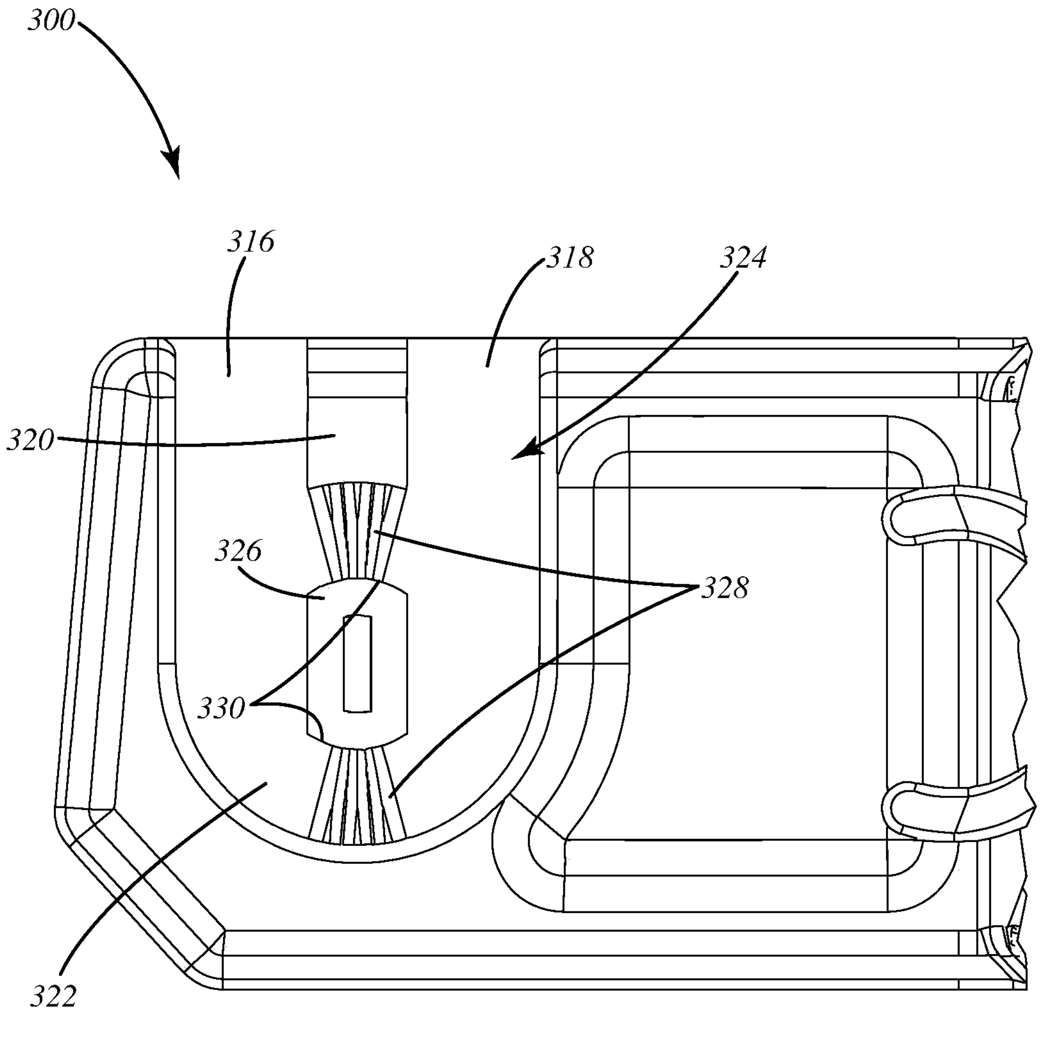
FIG. 9 illustrates a close-up partial view of a docking recession of a camera dock enclosure docking wing.

The adjustable camera mount system 100 includes one or more camera docks 300, 400. A permanent camera dock 300 is depicted in FIGS. 7-9 and a temporary camera dock 400 is depicted in FIGS. 10-16. Both camera docks 300, 400 include a base 302, 402 that is generally rectangular, however, in alternative embodiments the base 302, 402 can have a different shape. The base 302, 402 has a mounting face 304, 404 opposite a docking face 306, 406, and two opposite ends 308, 310, 408, 410. The camera dock 300, 400 further includes two opposing docking wings 312, 314, 412, 414 arranged at opposite ends 308, 310, 408, 410 extending away from the docking face 306, 406 of the base 302, 402 along a docking wing plane 305, 405. The docking wings 312, 314, 412, 414 facilitate docking the dockable camera enclosure 200 to the camera dock 300, 400. In some embodiments, the docking wings 312, 314, 412, 414 are integrally molded with the base 302, 402 such that the two docking wings 312, 314, 412, 414 and the base 302, 402 form a single integral unit. In other embodiments, the docking wings 312, 314, 412, 414 are joined to the base 302, 402, e.g., nails, screws, or other fasteners. In some embodiments, the docking wings 312, 314, 412, 414 are fixed in place relative to the base 302, 402 and in other embodiments, the docking wings 312, 314, 412, 414 are moveable relative to the base 302, 402 (e.g., via hinged connection between open and closed positions).

Figure 10:
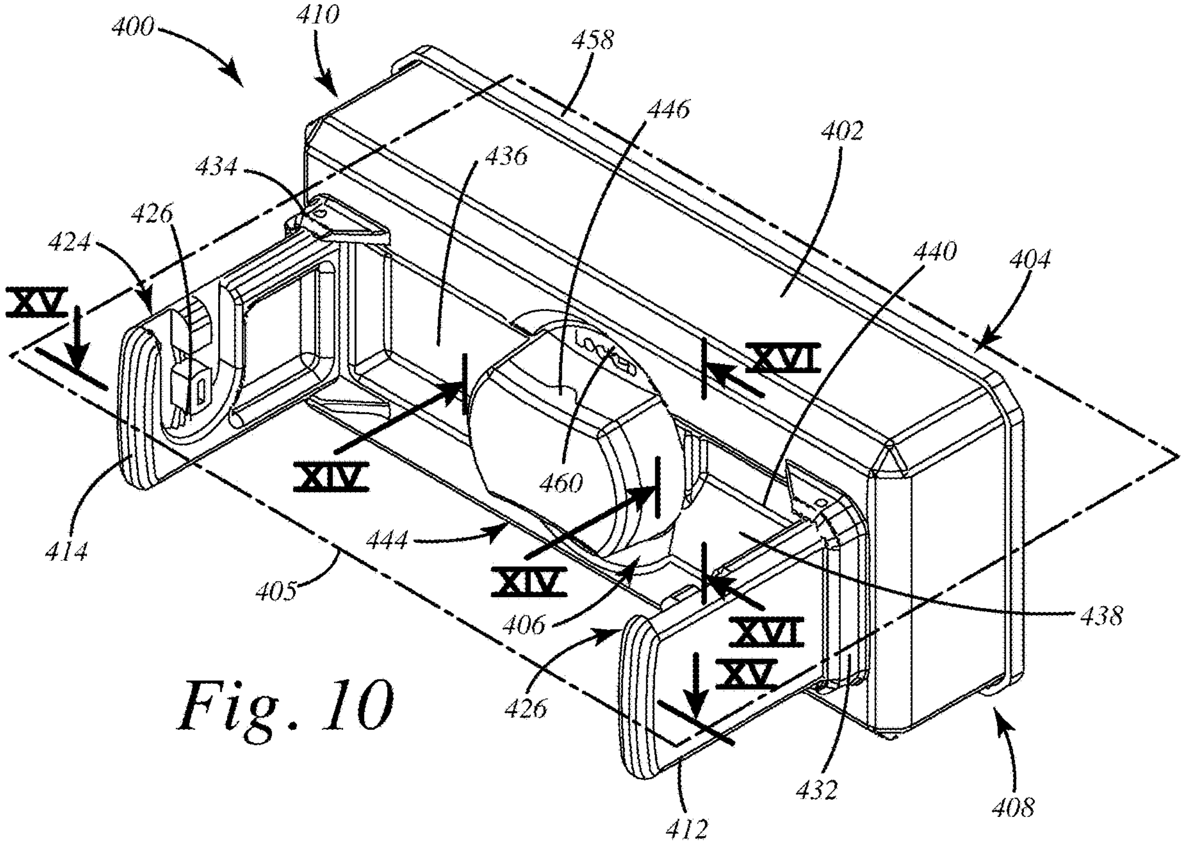
FIG. 10 illustrates a perspective view of a temporary camera dock with a suction handle in a locked position and two docking wings in a docking position.
Figure 11:
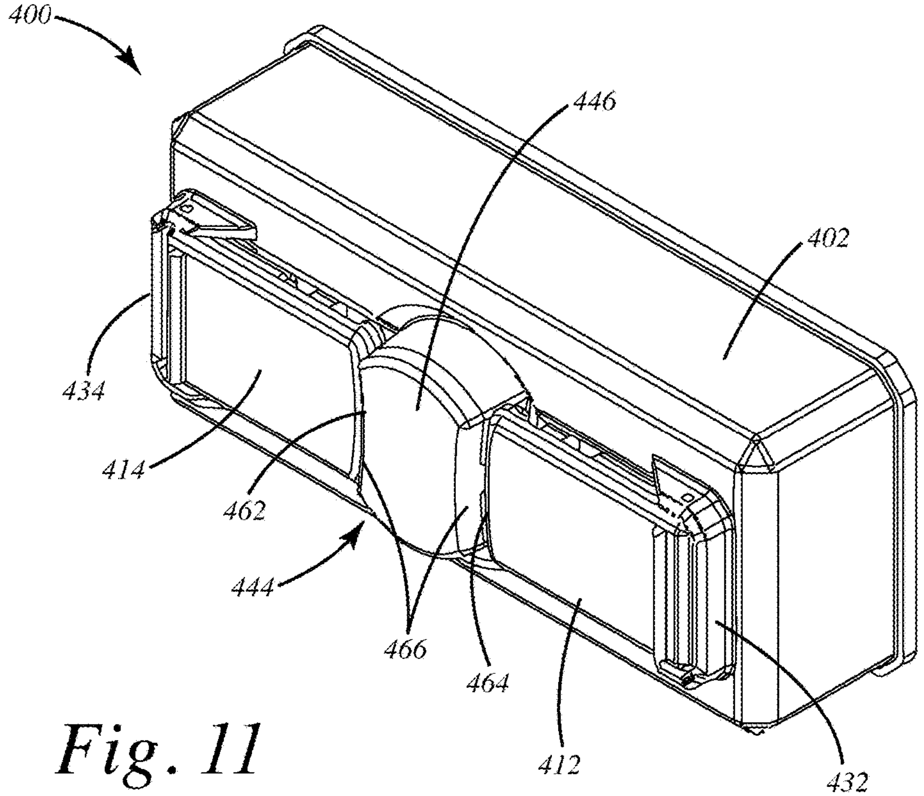
FIG. 11 illustrates a perspective view of a temporary camera dock with a suction handle in an unlocked position and two docking wings in a stowed position.
Figure 12:
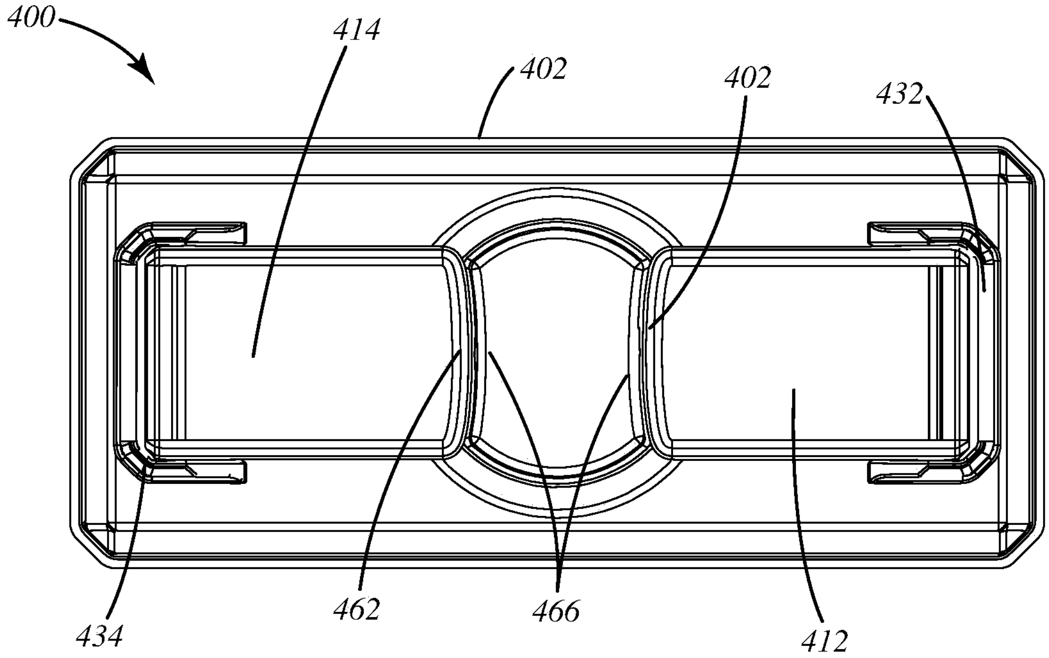
FIG. 12 illustrates a front view of a temporary camera dock with a suction handle in an unlocked position and two docking wings in a stowed position.
Figure 13:
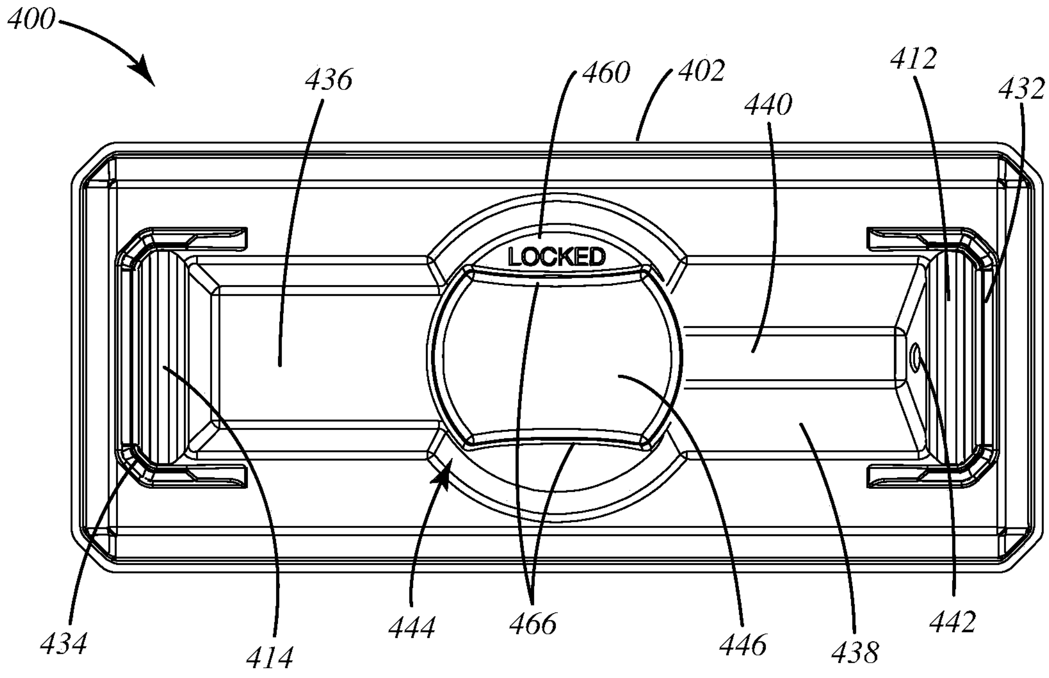
FIG. 13 illustrates a front view of a temporary camera dock with a handle in a locked position and two docking wings in a docking position.
Figure 14:
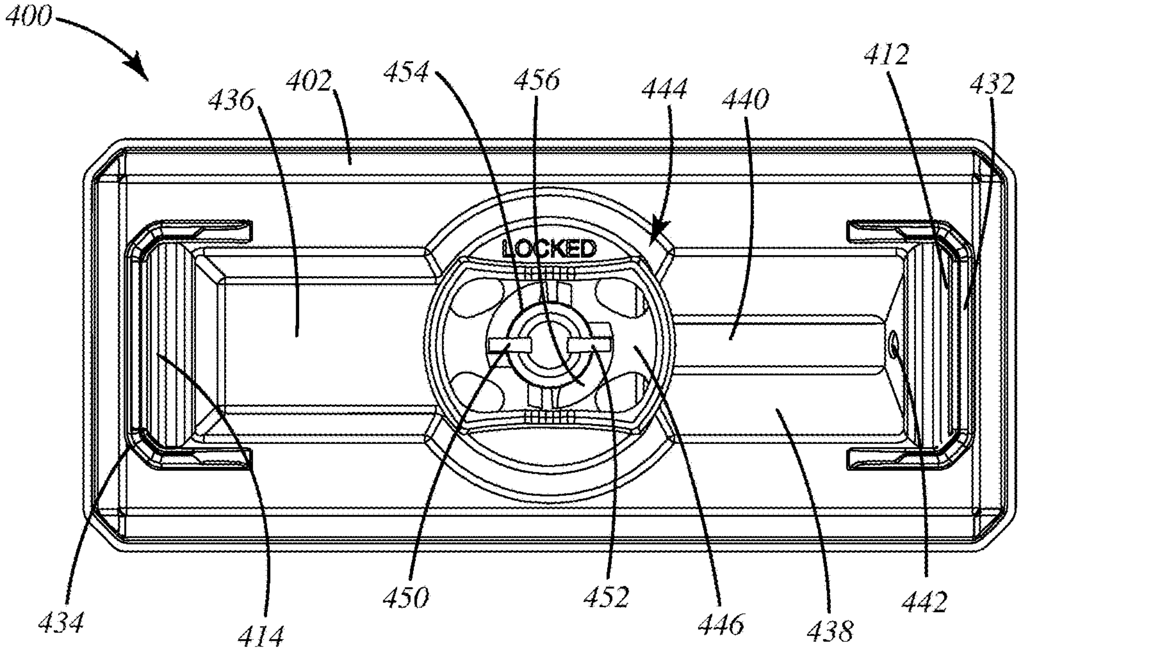
FIG. 14 illustrates a sectional view of a temporary camera dock with a suction handle in a locked position cut along a horizontal section of FIG. 13 to emphasize the ramp configuration of the suction system.

Each docking wing 312, 314, 412, 414 defines two docking channels 316, 318, 416, 418 for receiving the dockable camera enclosure 200. The two docking channels 316, 318, 416, 418 are generally parallel. Each docking channel 316, 318, 416, 418 is generally configured for receiving one of the arcuate arms 240, 242 of one of the spring-loaded plungers 218, 220. Each docking wing 312, 314, 412, 414 generally includes a docking alignment protrusion 320, 420 situated between the docking channels 316, 318, 416, 418 to facilitate efficient and smooth docking. Each docking wing 312, 314, 412, 414 further defines a retaining ring 322, 422. The two docking channels 316, 318, 416, 418 and the retaining ring 322, 422 cooperate to form a docking recession 324, 424. The retaining ring 322, 422 can be generally circular, elliptical, or another suitable arcuate shape. Each retaining ring 322, 422 has meshing teeth 328, 428 extending therefrom to form a retaining surface. Each meshing tooth 328, 428 can have a triangular prism like structure with a base 302, 402 at the retaining surface from which the meshing tooth 328, 428 extends and a meshing ridge at an end opposite the base 302, 402. The meshing teeth 328, 428 can be generally arranged along a radius of curvature of the respective retaining ring 322, 422. In other words, the meshing teeth 328, 428 can be arranged such that each meshing ridge radiates outwardly from and points toward a center point of the retaining ring 322, 422. Generally, the meshing teeth 328, 428 get wider as they radiate out from the center point. In certain embodiments, each docking wing 312, 314, 412, 414 includes a retaining protrusion 326, 426 to facilitate retaining the camera enclosure 200 in the docking channels 316, 318, 416, 418 while the orientation of the camera enclosure 200 is adjusted. Generally, the retaining protrusion 326, 426 is centered around the center point of the retaining ring 322, 422. The retaining protrusion 326, 426 can encourage alignment within the retaining ring 322, 422 of the two arcuate arms 240, 242 of the camera enclosure 200. For example, in some embodiments, the side surface of the arcuate arms 240, 242 can interface with a portion of the side surface 330, 430 of the retaining protrusion 326, 426 as the camera enclosure 200 rotates relative to the retaining rings 322, 422. The side surface 330, 430 may be arcuate such that it matches the arc of the arcuate arms 240, 242 as shown in FIGS. 7 and 10, or it may be flat.

The dockable camera enclosure 200 is configured to removably dock into and out of the camera dock 300, 400 at a docking orientation. The dockable camera enclosure 200 may be configured to dock with the camera dock 300, 400 without the use of tools. The docking orientation refers generally to an orientation where dockable camera enclosure 200 removably docks with the camera dock 300, 400 by aligning and moving the arcuate arms 240, 242 of the dockable camera enclosure 200 through the docking channels of the camera dock 300, 400 such that each arcuate arm 240, 242 can move through the respective docking channel 316, 318, 416, 418 without obstruction from the docking protrusion 320, 420 to seat the dockable camera enclosure 200 in the retaining rings 322, 422 such that the meshing teeth 244 of the arcuate arms 240, 242 do not contact the meshing teeth 328, 428 of the retaining ring 322, 422 at the docking orientation. For example, in the current embodiment the docking orientation is an orientation wherein the lens optic axis 227 is arranged perpendicular to the docking wing plane 305, 405. That is, the meshing teeth of the camera enclosure and the meshing teeth of the dock are not in contact when the camera enclosure (and hence the camera) are pointed at the ground. Generally, because the width between the docking wings 312, 314, 412, 414 is smaller than the width of the dockable camera enclosure 200 in the restored spring position, the spring loaded plungers 218, 220 of the dockable camera enclosure 200 are compressed (with inward force being exerted from both docking channels 316, 318, 416, 418 on the arcuate arms 240, 242 of the camera enclosure 200) during docking of the dockable camera enclosure 200 within the camera dock 300, 400.

The dockable camera enclosure 200 is also configured to be undocked from the camera dock 300, 400. Specifically, when the dockable camera enclosure 200 is seated, the seated camera enclosure 200 is secured in the base 302, 402 while oriented in any of the plurality of distinct indexing orientations and removable, without the use of tools, while oriented in one or more docking orientations. The dockable camera enclosure 200 can be undocked at the docking orientation, or at a distinct undocking orientation. In the current embodiment, undocking will occur at the docking orientation and is the orientation where the arcuate arms 240, 242 of the dockable camera enclosure 200 are in alignment with the docking channels 316, 318, 416, 418 of the camera dock 300, 400 such that each arcuate arm 240, 242 can move through the respective docking channel 316, 318, 416, 418 without obstruction from the docking protrusion until the arcuate arms 240, 242 are within the retaining ring 322, 422. For example, the docking orientation may be a 90-degree angle between a camera view axis and the docking channels 316, 318, 416, 418. The undocked dockable camera enclosure 200 can be redocked with the same camera dock 300, 400 or a different camera dock 300, 400.

The seated camera enclosure 200 is configured to rotate through 1) a plurality of distinct indexing orientations of the retaining rings 322, 422. These distinct indexing orientations are defined by friction between the meshing teeth 244 of the arcuate arms 240, 242 and the meshing teeth 328, 428 of the retaining rings 322, 422. The seated camera enclosure 200 is further configured to rotate through 2) the docking orientation of the retaining rings 322, 422 defined by lack of contact between the meshing teeth 244 of the arcuate arms 240, 242 and the meshing teeth 328, 428 of the retaining rings 322, 422. Specifically, once fully seated in the retaining ring of the docking channel 316, 318, 416, 418, the arcuate arms 240, 242 can be rotated relative to the retaining ring 322. That is, the dockable camera enclosure 200 can be rotated relative to the docking channel 316, 318, 416, 418 with the meshing teeth 244 of the arcuate arms 240, 242 of the dockable camera enclosure 200 interfacing with the meshing teeth 328, 428 of the retaining ring 322, 422 to provide selectable orientations. For example, the meshing teeth 328, 428 cooperate to provide a plurality of friction fits at certain pre-determined orientations that have sufficient force to maintain a stable camera orientation relative to the vehicle/trailer while being moved.

The dockable camera enclosure 200 is configured to be docked on the camera dock 300, 400 to form a selectively orientable camera. The dockable camera enclosure 200 can be generally positioned between the two opposing docking wings 312, 314, 412, 414 of the camera dock 300, 400 such that each pair of arcuate arms 240, 242 contacts one of the docking wings 312, 314, 412, 414. Specifically, the meshing teeth 328, 428 of each pair of arcuate arms 240, 242 couple with respective meshing teeth 328, 428 of one of the retaining rings 322, 422 such that the dockable camera enclosure 200 can be retained selectively at specific fixed view orientations within the camera dock 300, 400.

Figure 6:
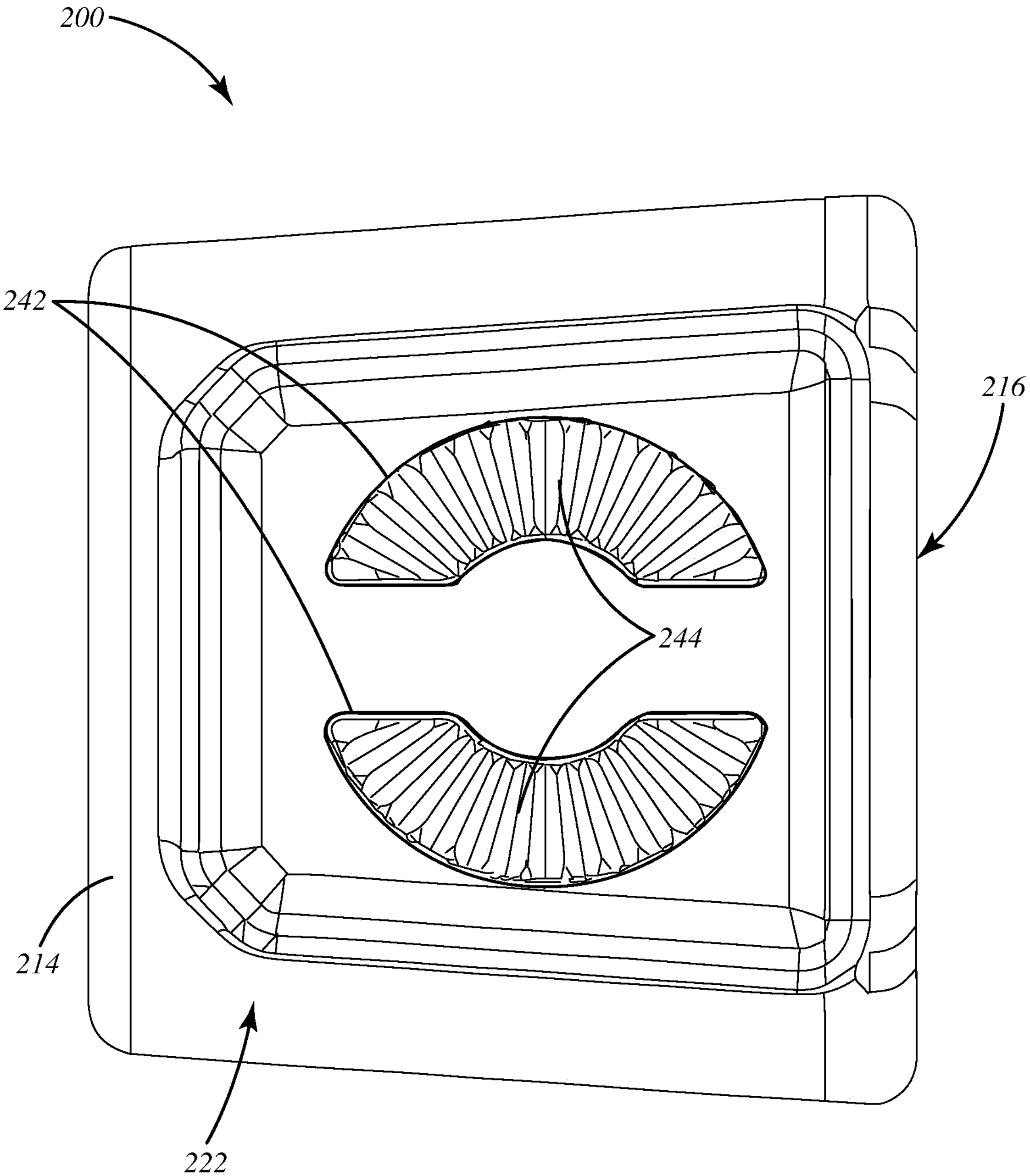
FIG. 6 illustrates a side view of a dockable camera enclosure.

The dockable camera enclosure 200 is configured to rotate through a plurality of distinct indexing positions (sometimes referred to as keyed positions) defined by friction between the meshing teeth 244 of the arcuate arms 240, 242 and the meshing teeth 244 of the retaining rings 322, 422. Specifically, the meshing teeth 328, 428 of the arcuate arms 240, 242 of the dockable camera enclosure 200 are rotationally movable about the retaining protrusion 326, 426 such that each meshing tooth 244 of the arcuate arms 240, 242 retainably contacts a different meshing tooth 328, 428 of the retaining rings 322, 422 of the camera dock 300, 400. Each distinct indexing position defines a discrete view orientation for a camera installed in the dockable camera enclosure 200. Therefore, each unique meshing tooth 328, 428 pairing defines a distinct indexing position and a discrete view orientation of the dockable camera enclosure 200. It will be appreciated that the shape, size, number, and position of the meshing teeth 244 of the arcuate arms 240, 242 and the meshing teeth 328, 428 of the retaining rings 322, 422 can be selected so that both sets of meshing teeth 328, 428 can retainably contact each other. In the current embodiment, the view orientation of the camera can range from about (−80 degrees relative to the horizontal to 80 degrees relative to the horizontal). Perhaps as best shown in FIG. 9, in the current embodiment there are six meshing teeth 328, 428 in the retaining ring 322, 422 (three arranged toward the top portion of the retaining ring 322, 422 and three arranged toward the bottom portion of the retaining ring 322, 422). Perhaps as best shown in FIG. 6, in the current embodiment there are twenty-four meshing teeth 244 on the end of the arcuate arms 240, 242 (thirteen on one arcuate arm 240, 242 and thirteen on the other 240, 242). The twenty-six meshing teeth 244 of each arcuate arms 240, 242 mesh with the respective six meshing teeth 244 of the retaining surface of one of the docking wings 312, 314, 412, 414 to provide a plurality of view orientations. In the current embodiment, the dockable camera enclosure 200 is configured to rotate 180 degrees from one docking orientation (e.g., where the camera aperture points downward), through multiple viewing orientations (e.g., where the camera aperture points at least partially rearward away from the face of the camera dock) to another docking orientation (e.g., where the lens optic axis points upward). Further, in the current embodiment, the multiple viewing orientations are separated by roughly 13.5-degrees, which is provided by the distance between the meshing teeth 244. As such, the current embodiment gives a user the ability to rotate the seated camera enclosure 200 within the camera dock 300, 400 through about thirteen different viewing orientations. While the retaining ring 322, 422 meshing teeth 328, 428 are discussed in connection with the permanent camera dock 300 of FIG. 6, the same arrangement and configuration of retaining ring meshing teeth can be seen in FIG. 16 of the temporary camera dock 400.

In some embodiments, the camera dock 300, 400 is a permanent camera dock 300. The permanent camera dock 300 is depicted in FIGS. 7-9. As defined herein, "permanent" means the camera dock 300 is configured to be attached (e.g., to a vehicle or trailer) such that it is not readily removable without the use of tools. In the current embodiment, the base of the permanent camera dock 300 is configured to be permanently coupled to a vehicle or vehicle trailer. To this end, the base 302 of the permanent camera dock 300 defines at least two mounting apertures 332, 334. The two mounting apertures 332, 334 are configured to receive a fastener such as a nail, bolt, screw, or rivet to permanently fasten the permanent camera dock 300 to a substrate. Generally, the substrate is a surface of a vehicle or trailer. The two mounting apertures 332, 334 are disposed towards opposite ends 308, 310 of the base 302 of the permanent camera dock 300. The base 302 of the permanent camera dock 300 can further define a power cable aperture 336. The power cable aperture 336 can be configured to route a power cable therethrough. The power cable can provide power to a camera disposed within the dockable camera enclosure 200. The power cable aperture 336 can be disposed between, and in a lateral base line with, the two mounting apertures 332, 334 to facilitate routing power through the permanent camera dock 300 and through the mounting surface (e.g., via a power cable aperture in the mounting surface).

The base of the permanent camera dock 300 can include a camera clip 338. The camera clip 338 can be forked, including two arms, and can define a center point. The center point of the camera clip 338 may be in the lateral base line of the power cable aperture 336 and the two mounting apertures 332, 334 such that the camera clip 338 is symmetrical about the base line.

In some embodiments, each enclosure docking wing 312, 314 defines a cutaway edge-portion. Generally, these cutaway edge-portions can be used to improve molding conditions for the camera dock 300, 400.

In certain embodiments, one or more of the camera docks 400 can be a temporary camera dock 400. One embodiment of a temporary camera dock 400 is depicted in FIGS. 10-16. The base of the temporary camera dock 400 is configured to temporarily join to a vehicle surface without the use of tools. As defined herein, "temporary" means the camera dock 400 is configured to be removed by a user without tools (i.e., by hand).

Each end of the docking face 406 of the base 402 of the temporary camera dock 400 includes two hinge retainers 432, 434 that extend away from the docking face 406. The two hinge retainers 432, 434 create a hinge between the docking wings 412, 414 and the base 402 and also prevent the docking wing 412, 414 from extending past ninety degrees from the body 402 of the temporary camera dock 400. The docking face 406 of the base 402 of the temporary camera dock 400 can define two wing receiving recessions 436, 438 on each end 408, 410 of the external face 406 to allow the docking wings 412, 414 to fold compactly into the base 402.

Each of the docking wings 412, 414 can be inwardly foldable about one of the hinges into a folded position. It will be appreciated that the docking wings 412, 414 may be either in a closed, folded position or an open, docking position. In the docking position, the docking wings 412, 414 are outwardly extended perpendicular to the base 402 of the temporary camera dock 400 such that the docking recessions 424 of the docking wings 412, 414 face each other and are positioned to receive the arcuate arms 240, 242 of the spring-loaded plunger 218, 220 of the dockable camera enclosure 200 so the dockable camera enclosure 200 can dock with the temporary camera dock 400. In the folded position, each docking wing 412, 414 is inwardly folded such that each is roughly parallel to the docking face 406 of the base 402 of the temporary camera dock 400. Each docking wing 412, 414 can pair with one of the wing receiving recessions 436, 438 such that each docking wing 412, 414 is received within the respective wing receiving recession 436, 438.

Figure 15:
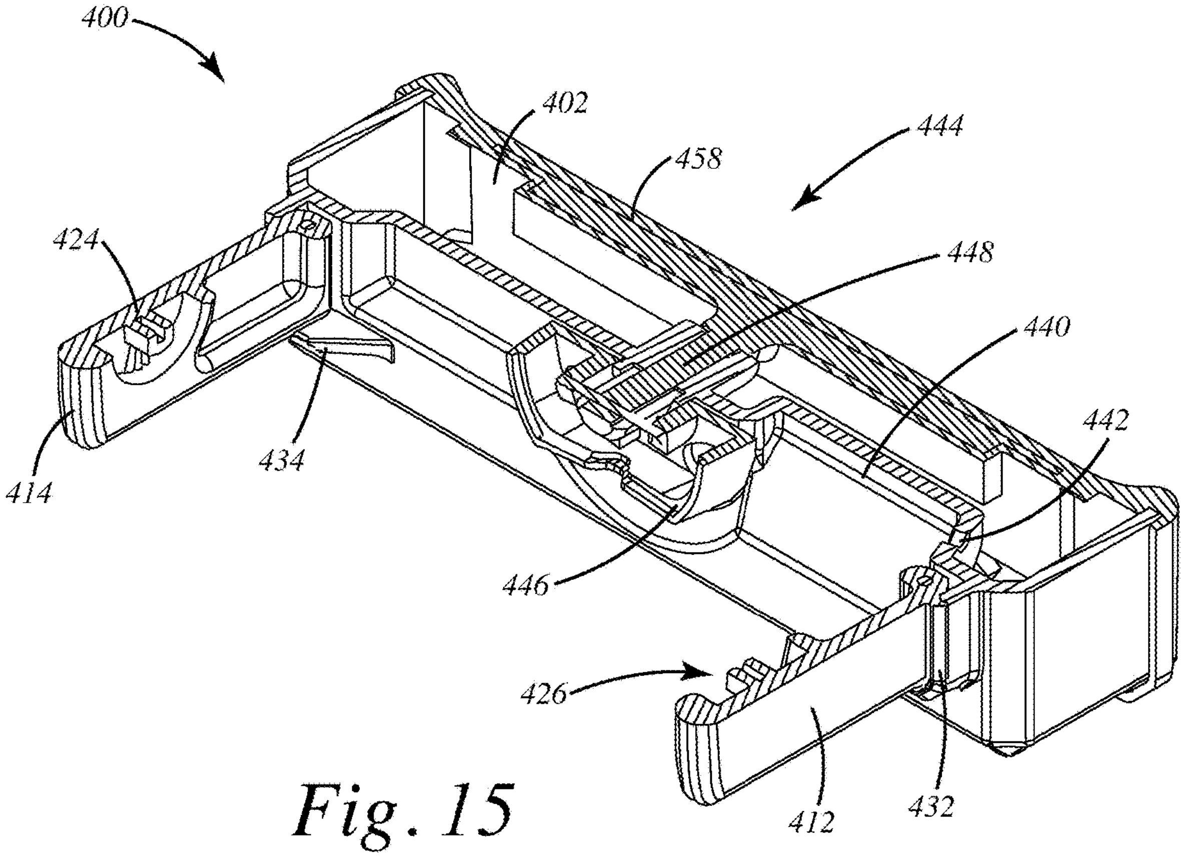
FIG. 15 illustrates a sectional view of a temporary camera dock with a suction handle in a locked position cut along a lateral section of FIG. 10.
Figure 16:
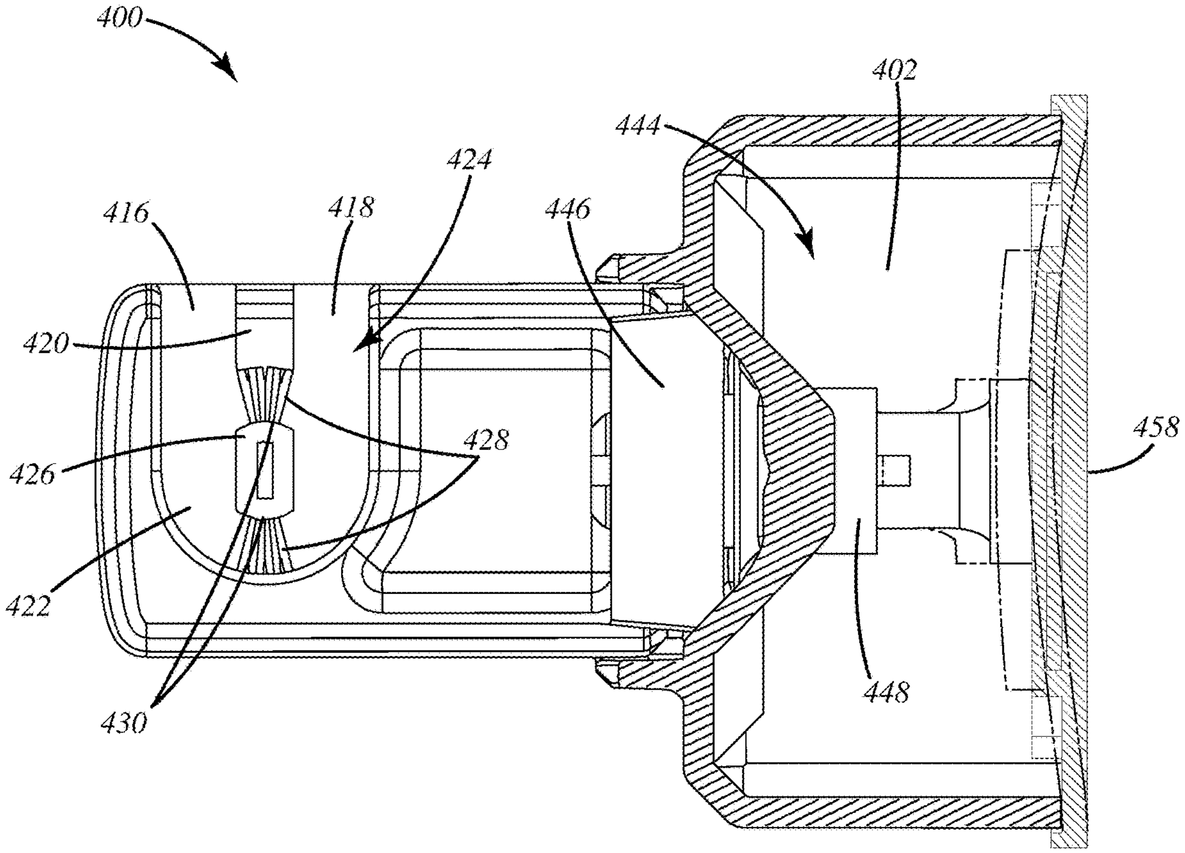
FIG. 16 illustrates a sectional view of a temporary camera dock with a handle in a locked position and two docking wings in a docking position cut along a vertical section of FIG. 10.

The base of the temporary camera dock 400 can further include a battery. The battery can be disposed within a battery compartment 440 of the base 402 of the temporary camera dock 400, e.g., as shown in FIG. 15. The battery can be a rechargeable or non-rechargeable battery. In current embodiments, the battery is permanently fixed and sealed in the base 402 of the temporary camera dock 400. The battery is generally rechargeable. The battery may be any battery suitable to power a camera. It will be appreciated that the battery's weight, size, shape, energy storage capacity, and power output can be based on the camera being used in connection with the dock 400. The base 402 of the temporary camera dock 400 may define a power cable aperture 442 capable of routing a power cable from the sealed battery to the camera (not shown) housed by the camera enclosure. This same cable can be utilized to charge the sealed battery.

The base 402 of the temporary camera dock 400 includes a suction system 444 configured to temporarily join the temporary camera dock 400 to a substrate (e.g., the back of a vehicle) without the use of tools. The suction system 444 will now be described in connection with FIGS. 10-11 and 13-16. Perhaps as best shown in FIG. 15, the suction system 444 includes a rotatable handle 446 joined to a suction mounting foot 458 by a rigid stem 448. The rigid stem 448 is laterally movable relative to the base 402 of the temporary camera dock 400 by rotating the handle 446. The rotatable handle 446 is configured to rotate between an unlocked position where the rigid stem 448 is at a first lateral position and a locked position where the rigid stem 448 is at a second lateral position. The handle 446 includes two tabs 450, 452 on opposite ends of the rigid stem 448. The base 402 of the temporary camera dock 400 includes a suction ramp 454, 456 disposed on the docking face 406 of the base 402. Each tab 450, 452 rests on a respective suction ramp 454, 456 that defines an unlocked position detent toward the bottom of the suction ramp 454, 456 and a locked position detent toward the top of the suction ramp 454, 456. By virtue of the handle tabs 450, 452 riding up and down the suction ramp 454, 456, rotational handle movement is converted into lateral movement of the rigid stem 448 (and therefore the suction mounting foot 458), which in turn creates suction against the mounting surface.

In the unlocked position, both tabs 450, 452 are disposed within the unlocked position detents at the bottoms of the suction ramps 454, 456 such that the rigid stem 448 is snap fit into the unlocked position at the first lateral position. As the handle 446 is rotated (e.g., counter-clockwise), the tabs 450, 452 of the rigid stem 448 are snapped out of the unlocked position detents and ride up the suction ramps 454, 456 as the rigid stem 448 moves laterally away from the first lateral position and toward the second lateral position. In the locked position (shown in FIG. 14), both tabs of the rigid stem 448 are disposed within the locked position detent at the tops of the suction ramps 454, 456 such that the rigid stem 448 is snap fit into the locked position at the second lateral position. As the handle 446 is rotated in the opposite direction (e.g., clockwise), the tabs 450, 452 are snapped out of the locked position detents and ride down the suction ramps 454, 456 as the rigid stem 448 moves laterally away from the second lateral position and toward the first lateral position. In the locked position, the suction mounting foot 458 is pulled inward toward the handle to an engaged position such that a vacuum is created between the mounting surface and the mounting foot 458. Because the mounting foot 458 is made of a non-rigid material (e.g., rubber, silicone, or another suitable material) relative to the rigid stem, the mounting foot 458 bends at the edges away from the rigid stem 448 forming a concave shape that facilitates the suction vacuum. In the unlocked position, the suction mounting foot 458 is released such that the center of the suction mounting foot 458 returns to a relaxed position relative to the base 402. As such, the temporary camera dock 400 can be easily engaged and disengaged from the mounting surface without the use of tools.

Generally, the locked position of the handle 446 is perpendicular to the unlocked position of the handle 446. In some embodiments, the temporary camera dock 400 includes an indicator 460 that signals to a user when the handle 446 is in a locked position. The indicator 460 may include essentially any indicator 460 effective to alert a user that the handle is in a locked position including indicia, light indicators, noise indicators and the like. In some embodiments, the indicator 460 is indicia printed on the external face of the base that is exposed when the handle 446 is rotated to the locked position and hidden by the handle 446 when the handle 446 is rotated to the unlocked position.

In certain embodiments of the temporary camera dock 400, the end of each docking wing 412, 414 includes a convex edge 462, 464. The handle 446 of the suction system 444 of the temporary camera dock 400 can define a pair of concave walls 466 such that each concave wall 466 can receive the convex edge 462, 464 of one of the docking wings 412, 414. Specifically, the concave walls 466 of the handle 446 in the unlocked position are generally configured to receive the convex edges 462, 464 of the docking wings 412, 414 in the folded position. The handle 446 may include a cover defining a power cable aperture configured to route a power cable.

Although the different elements and assemblies of the embodiments are described herein as having certain functional characteristics, each element and/or its relation to other elements can be depicted or oriented in a variety of different aesthetic configurations, which support the ornamental and aesthetic aspects of the same. Simply because an apparatus, element or assembly of one or more of elements is described herein as having a function does not mean its orientation, layout or configuration is not purely aesthetic and ornamental in nature.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation (s).

In addition, when a component, part or layer is referred to as being "joined with," "on," "engaged with," "adhered to," "secured to," or "coupled to" another component, part or layer, it may be directly joined with, on, engaged with, adhered to, secured to, or coupled to the other component, part or layer, or any number of intervening components, parts or layers may be present. In contrast, when an element is referred to as being "directly joined with," "directly on," "directly engaged with," "directly adhered to," "directly secured to," or "directly coupled to" another element or layer, there may be no intervening elements or layers present. Other words used to describe the relationship between components, layers and parts should be interpreted in a like manner, such as "adjacent" versus "directly adjacent" and similar words. As used herein, the term "and/or" includes any and all combinations of one or more of the associated listed items.

The above description is that of current embodiments of the invention. Various alterations and changes can be made without departing from the broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, any combination of X, Y and Z, for example, X, Y, Z; X, Y; X, Z; Y, Z, and/or any other possible combination together or alone of those elements, noting that the same is open ended and can include other elements.

What is claimed is:

1. An adjustable camera mount apparatus, the apparatus comprising:

a dockable camera enclosure including:

a body defining an internal space for receiving a camera, and the body having two opposite ends and a face including a camera aperture defining a lens optics axis therethrough;

an outer wall on each end of the body, each of the outer walls having a pair of arcuate apertures; and two spring-loaded plungers, each spring-loaded plunger including a platform disposed within the internal space, and two arcuate arms projecting from the platform and extending through the arcuate apertures, each arcuate arm having meshing teeth arranged along a radius of curvature of the arcuate arm; and a camera dock including:

a base having a docking face and a mounting face; and two opposing docking wings connected to and extending away from the docking face along a docking wing plane, each docking wing defining two parallel docking channels for receiving the arcuate arms of one of the spring-loaded plungers and a retaining ring having meshing teeth arranged along a radius of the retaining ring; and wherein the dockable camera enclosure is configured to removably dock into and out of the camera dock without the use of tools, wherein the dockable camera enclosure is further configured to removably dock at a docking orientation wherein the lens optics axis is arranged perpendicular to the docking wing plane;

whereby the dockable camera enclosure removably docks with the camera dock by aligning and moving the arcuate arms of the dockable camera enclosure through the docking channels of the camera dock to seat the dockable camera enclosure in the retaining rings such that the meshing teeth of the arcuate arms do not contact the meshing teeth of the retaining ring at the docking orientation;

wherein the seated camera enclosure is configured to rotate through 1) a plurality of distinct indexing orientations of the retaining rings defined by friction between the meshing teeth of the arcuate arms and the meshing teeth of the retaining rings; and 2) the docking orientation of the retaining rings defined by lack of contact between the meshing teeth of the arcuate arms and the meshing teeth of the retaining rings; and whereby the seated camera enclosure is secured in the base while oriented in any of the plurality of distinct indexing orientations and removable, without the use of tools, while oriented in one of the one or more docking orientations.

2. The adjustable camera mount apparatus of claim 1, wherein the camera dock is a permanent camera dock such that the base of the permanent camera dock is configured to be permanently coupled to a vehicle trailer.

3. The adjustable camera mount apparatus of claim 2, wherein the base of the permanent camera dock defines at least two mounting apertures, each mounting aperture configured to receive a fastener.

4. The adjustable camera mount apparatus of claim 1, wherein the base of the permanent camera dock further defines a camera power cable aperture configured to route a camera power cable.

5. The adjustable camera mount apparatus of claim 1, wherein the camera dock is a temporary camera dock and the base of the temporary camera dock includes a suction system configured to temporarily join the temporary camera dock to a vehicle without the use of tools.

6. The adjustable camera mount apparatus of claim 5, wherein the suction system includes:

a ramp disposed on the docking face of the base;

a rotatable handle connected to a suction mounting foot by a rigid stem, the handle being configured to rotate between an unlocked position where the rigid stem is at a first lateral position and a locked position where the rigid stem is at a second lateral position;

wherein the rigid stem is laterally movable relative to the base of the temporary camera dock; and wherein the handle includes a tab that engages the ramp to convert rotational movement of the handle into lateral movement, whereby rotation of the handle moves the rigid stem laterally between an unlocked position detent at a bottom of the ramp and a locked position detent at a top of the ramp.

7. The adjustable camera mount apparatus of claim 5, including a pair of hinges configured to hingedly couple the docking face of the base of the temporary camera dock and the docking wings of the temporary camera dock;

wherein the pair of hinges facilitate rotating the docking wings of the temporary camera dock between a closed, folded position, and an open, unfolded, position.

8. The adjustable camera mount apparatus of claim 1, wherein the body of the dockable camera enclosure includes two interior walls, the interior walls trisect the internal space into a camera receiving space and two plunger receiving spaces;

the camera receiving space is defined by the two interior walls of the body, the face of the body, and an open end of the body; and each plunger receiving space is defined by one of the interior walls of the body, one of the outer walls of the body, the face of the body, and by the open end of the body.

9. The adjustable camera mount apparatus of claim 8, wherein each spring-loaded plunger further includes a compression spring joined to the platform; and wherein each spring-loaded plunger is disposed partially within one of the plunger receiving spaces such that:

the compression spring is disposed completely within one of the plunger receiving spaces of the body and contacts one of the internal walls of the body, the platform is completely disposed within the plunger receiving space, and the two arcuate arms project from the platform and extend through the arcuate apertures.

10. The adjustable camera mount apparatus of claim 1, wherein the apparatus further comprises a camera configured to wirelessly communicate data.

11. An adjustable camera mount system, the system comprising:

an interchangeable dockable camera enclosure including a body defining an internal space for receiving a camera, the body having two opposite ends and a face including a camera aperture;

a temporary camera dock including a base, a battery, a suction system, and two opposing docking wings joined to the base, wherein the temporary camera dock is configured to temporarily join to a vehicle or vehicle trailer without the use of tools; and a permanent camera dock including a base and two opposing docking wings connected to the base, the base being configured for permanent coupling to a vehicle or a vehicle trailer;

wherein the interchangeable dockable camera enclosure is configured for selective and interchangeable docking at a docking orientation with either the temporary camera dock or the permanent camera dock without the use of tools, such that the interchangeable dockable camera enclosure is docked;

wherein the interchangeable docked camera enclosure is configured to rotate through a plurality of distinct and secure indexing positions and a docking position while docked with either the temporary camera dock or the permanent camera dock; and wherein the interchangeable docked camera enclosure is configured for undocking at the docking orientation from either the temporary camera dock or the permanent camera dock without the use of tools, such that the interchangeable dockable camera enclosure is re-dockable.

12. The adjustable camera mount system of claim 11, wherein the system further comprises a camera configured to wirelessly communicate data.

13. The adjustable camera mount system of claim 11, wherein the system further comprises a vehicle or a vehicle trailer.

14. The adjustable camera mount system of claim 11, wherein the interchangeable dockable camera enclosure includes an outer wall on each end of the body, each of the outer walls having a pair of arcuate apertures; and two spring loaded plungers, each spring-loaded plunger including a platform disposed within the internal space, and two arcuate arms projecting from the platform and extending through the arcuate apertures, each arcuate arm having meshing teeth arranged along a radius of curvature of the arcuate arm;

wherein each docking wing of the temporary camera dock and each docking wing of the permanent camera dock defines two parallel docking channels for receiving the arcuate arms and a retaining ring having meshing teeth arranged along a radius of the retaining ring, and wherein the dockable camera enclosure is configured to rotate through a plurality of distinct indexing positions defined by friction between the meshing teeth of the arcuate arms and the meshing teeth of the retaining rings.

15. The adjustable camera mount system of claim 11, wherein the base of the permanent camera dock defines at least two mounting apertures, each mounting aperture configured to receive a fastener.

16. The adjustable camera mount system of claim 15, wherein the base of the permanent camera dock further defines a power cable aperture configured to route a power cable.

17. The adjustable camera mount system of claim 11, wherein the suction system includes:

a ramp disposed on the docking face of the base;

a rotatable handle connected to a suction mounting foot by a rigid stem, the handle being configured to rotate between an unlocked position where the rigid stem is at a first lateral position and a locked position where the rigid stem is at a second lateral position;

wherein the rigid stem is laterally movable relative to the base of the temporary camera dock; and wherein the handle includes a tab that engages the ramp to convert rotational movement of the handle into lateral movement, whereby rotation of the handle moves the rigid stem laterally between an unlocked position detent at a bottom of the ramp and a locked position detent at a top of the ramp.

18. The adjustable camera mount system of claim 11, wherein the temporary camera dock includes:

a pair of hinges configured to hingedly couple the docking face of the base of the temporary camera dock and the docking wings of the temporary camera dock;

wherein the pair of hinges facilitate rotating the docking wings of the temporary camera dock between a closed, folded position, and an open, unfolded, position.

19. The adjustable camera mount system of claim 11, wherein the body of the dockable camera enclosure includes two parallel interior walls, the interior walls trisect the internal space into a camera receiving space and two plunger receiving spaces;

the camera receiving space is defined by the two interior walls of the body, the face of the body, and an open end of the body; and each plunger receiving space is defined by one of the interior walls of the body, one of the outer walls of the body, the face of the body, and by the open end of the body.

20. The adjustable camera mount system of claim 19, wherein each spring-loaded plunger further includes a compression spring joined to the platform; and wherein each spring-loaded plunger is disposed partially within one of the plunger receiving spaces such that:

the compression spring is disposed completely within one of the plunger receiving spaces of the body and contacts one of the internal walls of the body, the platform is completely disposed within the plunger receiving space, and the two arcuate arms project from the platform and extend through the arcuate apertures.

* * * * *